United States Patent
Zu et al.

(10) Patent No.: US 10,666,121 B2
(45) Date of Patent: May 26, 2020

(54) LINEAR VIBRATION MOTOR

(71) Applicant: GOERTEK INC., WeiFang (CN)

(72) Inventors: Fenglei Zu, WeiFang (CN); Chunfu Liu, WeiFang (CN)

(73) Assignee: GOERTEK INC., Weifang, Shandong (CN)

( * ) Notice: Subject to any disclaimer, the term of this patent is extended or adjusted under 35 U.S.C. 154(b) by 107 days.

(21) Appl. No.: 15/762,055

(22) PCT Filed: Dec. 15, 2015

(86) PCT No.: PCT/CN2015/097465
§ 371 (c)(1),
(2) Date: Mar. 21, 2018

(87) PCT Pub. No.: WO2017/049777
PCT Pub. Date: Mar. 30, 2017

(65) Prior Publication Data
US 2018/0287476 A1    Oct. 4, 2018

(30) Foreign Application Priority Data
Sep. 23, 2015  (CN) .......................... 2015 1 0613787

(51) Int. Cl.
*H02K 33/14*    (2006.01)
*H02K 33/18*    (2006.01)
*H02K 5/22*    (2006.01)

(52) U.S. Cl.
CPC ............ *H02K 33/14* (2013.01); *H02K 5/225* (2013.01); *H02K 33/18* (2013.01)

(58) Field of Classification Search
CPC .......... H02K 33/14; H02K 5/22; H02K 33/18; H02K 5/225
See application file for complete search history.

(56) References Cited

U.S. PATENT DOCUMENTS

| 6,476,702 B1 * | 11/2002 | Hartwig | ................ F16F 7/1005 335/220 |
| 2011/0291497 A1 * | 12/2011 | Choi | ...................... H02K 33/18 310/25 |

(Continued)

FOREIGN PATENT DOCUMENTS

| CN | 1592049 A | 3/2005 |
| CN | 101488697 A | 7/2009 |

(Continued)

OTHER PUBLICATIONS 201510613787.3 Office Action, State Intellectual Property Office of the P.R. China, dated Apr. 1, 2017.

(Continued)

*Primary Examiner* — Naishadh N Desai
(74) *Attorney, Agent, or Firm* — Holzer Patel Drennan

(57) ABSTRACT

A linear vibration motor comprises a vibrator and a stator arranged parallel to the vibrator. The vibrator comprises a counterweight block and a vibration block embedded and fixed in the counterweight block. Permanent magnets in the vibration block and electromagnets in the stator generate the push-pull forces acting on each other. The electromagnets in the stator generates a variable magnetic field after being energized, and drives the vibrator to move reciprocally along the direction parallel to the plane in which the stator is located by changing the direction of the magnetic field lines of the magnetic field. With the repulsive force between two ends the permanent magnets having the same polarity, the linear vibration motor allows the magnetic field lines of the permanent magnets to concentratedly pass through coils, thus obtaining a larger magnetic flux and a stronger vibration effect.

9 Claims, 5 Drawing Sheets

(56) References Cited

U.S. PATENT DOCUMENTS

| | | | | |
|---|---|---|---|---|
| 2012/0169148 A1* | 7/2012 | Kim | ...................... | H02K 33/16 |
| | | | | 310/25 |
| 2012/0227269 A1* | 9/2012 | Subramanian | ........ | B26B 19/282 |
| | | | | 30/210 |
| 2015/0256042 A1* | 9/2015 | Li | .......................... | H02K 5/161 |
| | | | | 310/273 |
| 2017/0288523 A1* | 10/2017 | Katada | .................. | H02K 33/16 |

FOREIGN PATENT DOCUMENTS

| | | |
|---|---|---|
| CN | 1577016 U | 9/2010 |
| CN | 201789399 U | 4/2011 |
| CN | 102570764 A | 7/2012 |
| CN | 202334238 U | 7/2012 |
| CN | 102684445 A | 9/2012 |
| CN | 204947868 U | 1/2016 |
| JP | H08116658 A | 5/1996 |

OTHER PUBLICATIONS

International Search Report and Written Opinion, State Intellectual Property Office of the P.R. China, dated Apr. 1, 2017.

* cited by examiner

LINEAR VIBRATION MOTOR

TECHNICAL FIELD

The present invention relates to the technical field of consumer electronics, and more particularly, to a linear vibration motor applied to portable consumer electronic products.

BACKGROUND

With the development of communication technology, the portable electronic products, such as mobile phones, handheld game consoles or handheld multimedia entertainment devices, etc. are gradually getting closer to people's lives. In these portable electronic products, a micro-vibration motor is generally used for system feedback, such as call prompt of mobile phones, the vibration feedback of the game consoles, and so on. However, with the development trend of thinner and lighter design of electronic products, the various kinds of internal components also need to adapt to this trend, and the micro-vibration motor is no exception.

The conventional micro-vibration motor generally includes an upper cover and a lower cover that forms a vibration space with the upper cover; a vibrator (including a counterweight block and a permanent magnet) that conducts a linear reciprocating vibration in the vibration space; an elastic support component connecting the upper cover and making the vibrator conduct the reciprocating vibration; and a coil located at a distance below the vibrator.

In the micro-vibration motor of such a structure as described above, the permanent magnet and the coil are placed perpendicular to each other, that is, the magnetizing direction of the permanent magnet is parallel to the axis direction of the coil, so that the magnetic field lines of the permanent magnet can pass perpendicularly through the coil so as to make the best use of the magnetic field of the permanent magnet. However, in the above structure of the micro-vibration motor, the vibrator and the stator occupy a relatively large space, which is not conducive to the miniaturization of the motor. Moreover, the magnetic field lines generated by the permanent magnet itself in the vibrator are relatively dispersed, and the magnetic field lines generated is still not sufficiently utilized. Accordingly, the magnetic flux that passes through the coil will be smaller, and the resulting acting force will be smaller, which will affect the effect of vibration. When moving to both ends, there is very little amount of magnetic flux passing through the coil due to the vertical magnetization, thus affecting the sense of vibration of electronic products, and the linear vibration response speed is slow and the vibration sense is small.

SUMMARY

In view of the above problems, it is an object of the present invention to provide a linear vibration motor which is a motor magnetized in the horizontal direction, in the linear vibration motor, the vibrator and the stator are disposed in parallel, the electromagnet in the stator and the permanent magnet in the vibrator generate the push-pull forces which interact with each other by changing the directions of the magnetic field lines by energizing the electromagnet in the stator, so as to drive the vibrator to move reciprocally along the direction parallel to the plane in which the stator is located.

The linear vibration motor provided by the present invention comprises a vibrator and a stator arranged in parallel with the vibrator, the vibrator comprises a counterweight block and a vibration block embedded and fixed in the counterweight block, wherein a permanent magnet in the vibration block and an electromagnet in the stator generate push-pull forces which interact with each other; the electromagnet in the stator generates a variable magnetic field after being energized, so as to drive the vibrator to conduct a reciprocating motion along a direction parallel to a plane in which the stator is located, by changing directions of magnetic field lines of the magnetic field.

Wherein, a preferred technical solution is that, an avoiding structure for avoiding the stator is arranged in a middle portion of the counterweight block; and a groove for accommodating the vibration block is arranged at a central position of the avoiding structure on the counterweight block.

Wherein, a preferred technical solution is that, the vibration block comprises three permanent magnets disposed adjacent to each other, and magnetic conductive yokes disposed between any two adjacent permanent magnets, adjacent ends of any two adjacent permanent magnets have the same polarities; further, the stator comprises two coils provided corresponding to the vibrator and two magnetic conductive cores provided in the coils respectively, and an axial direction of the coils is perpendicular to a magnetization direction of the permanent magnets.

Wherein, a preferred technical solution is that, the vibration block comprises at least two permanent magnets disposed adjacent to each other and a magnetic conductive yoke disposed between any two adjacent permanent magnets; the electromagnet in the stator comprises a coil and a magnetic conductive core located in the coil; and the magnetic conductive yoke and the magnetic conductive core are misaligned.

Wherein, a preferred technical solution is that, vibration guiding shafts, limit springs and limit blocks are provided at two ends of the counterweight block respectively, and the limit springs are sleeved on the vibration guiding shafts and are limited between the counterweight block and the limit blocks; and guiding holes for reciprocating movements of the vibration guiding shafts are further provided in the limit blocks; and shaft sleeves are sleeved on one end of the vibration guiding shafts penetrating into the guiding holes.

Wherein, a preferred technical solution is that, the linear vibration motor further comprises a housing; the vibration guiding shafts are fixedly connected with the counterweight block, the limit blocks are fixedly connected with the housing; or the vibration guiding shafts are fixedly connected with the housing, and the limit blocks are fixedly connected with the counterweight block.

Wherein, a preferred technical solution is that, the counterweight block is a tungsten steel block, a nickel steel block or a nickel-tungsten alloy block.

Wherein, a preferred technical solution is that, the linear vibration motor further comprises a housing and a flexible circuit board; the stator is fixedly connected with the housing through the flexible circuit board; and a lead of the coil is connected to an external circuit through a circuit on the flexible circuit board.

The above-mentioned linear vibration motor according to the present invention jumps out of the existing design concept of a motor in which the permanent magnets and the coils are placed perpendicularly to each other. In the linear vibration motor according to the present invention, the permanent magnet of the vibrator is placed in parallel with the stator, the direction of the magnetic field lines is changed by changing the energizing direction of the electromagnet in the stator, so that the vibrator is driven to move reciprocally in the direction parallel to the plane in which the stator is located, which effectively reduces the volume of the motor and further facilitates the miniaturization of the motor.

In order to achieve the above and related objects, one or more aspects of the present invention comprise the features described below in detail and particularly pointed out in claims. The following description and the accompanying drawings set forth in detail certain illustrative aspects of the present invention. However, these aspects indicate only some of the various ways in which the principles of the present invention may be employed. In addition, the present invention is intended to comprise all such aspects as well as their equivalents.

BRIEF DESCRIPTION OF DRAWINGS

By reference to the following description taken in conjunction with the accompanying drawings and the contents of claims, and with a more complete understanding of the present invention, other objects and results of the present invention will become more apparent and more readily appreciated. In the accompanying drawings:

Figure 1:
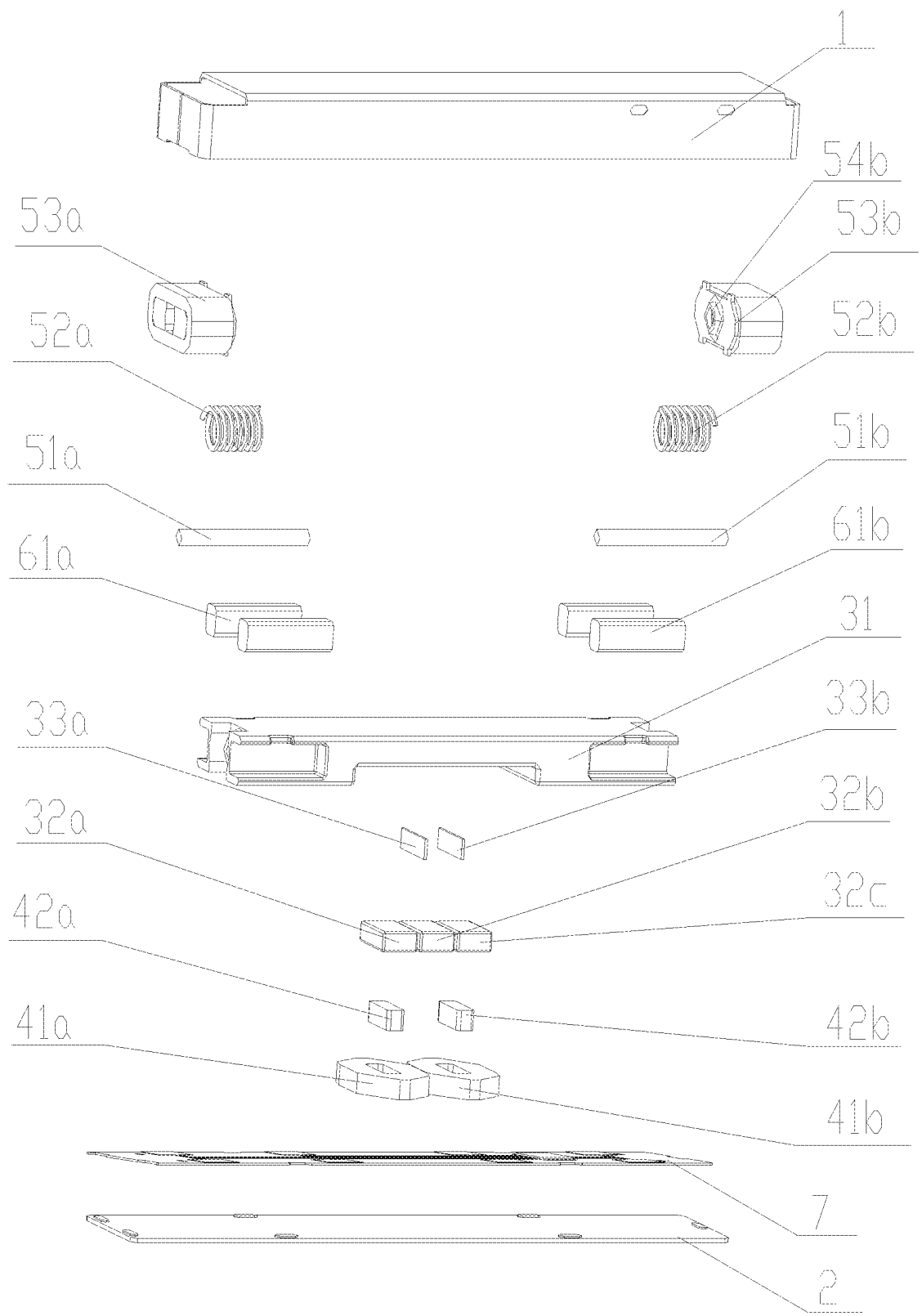
FIG. 1 is a schematic diagram of an overall exploded structure of a linear vibration motor according to an embodiment of the present invention.

In the drawings: upper housing 1; back cover 2; counterweight block 31; permanent magnets 32a, 32b, 32c, 32a', 32b'; magnetic conductive yokes 33a, 33b, 33a'; coils 41a, 41b, 41'; magnetic conductive cores 42a, 42b, 42'; vibration guiding shafts 51a, 51b; limit springs 52a, 52b; limit blocks 53a, 53b; guiding holes 56a; shaft sleeves 54a, 54b; balance magnets 61a, 61b; flexible circuit board 7.

The same reference numbers in all of the drawings indicate similar or corresponding features or functions.

DETAILED DESCRIPTION

In the following description, for the purposes of explanation, numerous specific details are set forth in order to provide a thorough understanding of one or more embodiments. However, it is apparent that these embodiments may be practiced without these specific details. In other examples, the well-known structures and devices are illustrated in the form of a block diagram for the convenience of describing one or more embodiments.

The "counterweight block" used in the description of the following specific embodiments may also be referred to as a "mass block", both of which refer to a high-quality, high-density metal block that is fixed to a permanent magnet that generates vibration to enhance vibration balance.

The specific embodiments of the present invention will be described in detail below with reference to the accompanying drawings.

In order to solve the problem of inconvenient miniaturization of the motor due to the permanent magnet and the coil being placed perpendicularly to each other in the existing micro-vibration motor structure, the linear vibration motor provided by the present invention places the vibrator and the stator in parallel, so that the electromagnet in the stator is energized to drive the vibrator to do the reciprocating motion along the direction parallel to the plane in which the stator is located by changing the direction of the magnetic field lines of the magnetic field.

Figure 2:
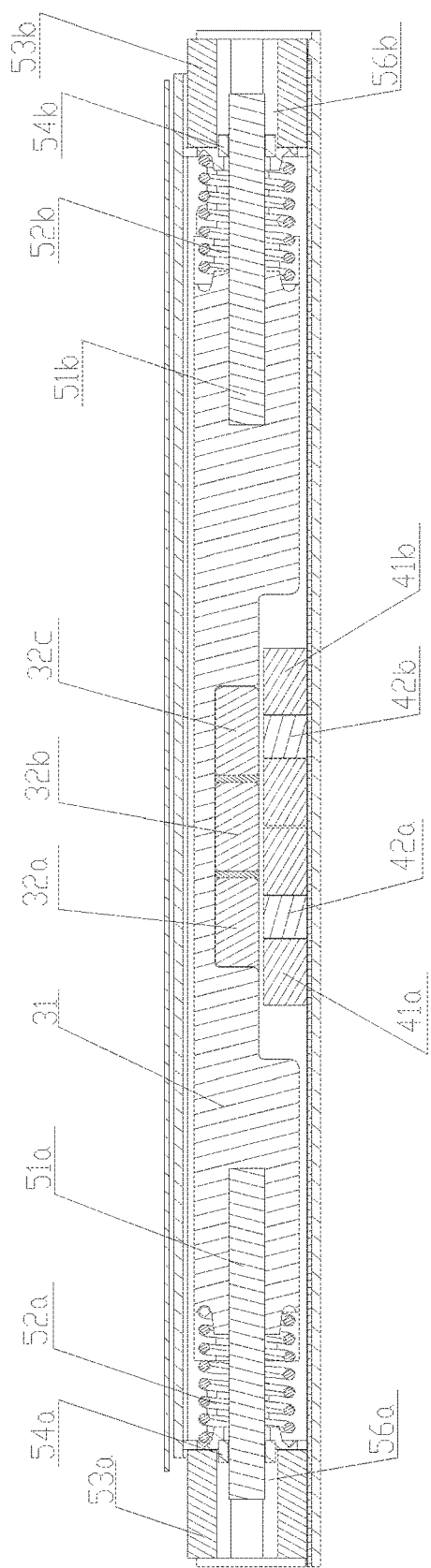
FIG. 2 is a schematic diagram of a combined structure of a linear vibration motor according to an embodiment of the present invention.

Specifically, FIG. 1 and FIG. 2 respectively show an overall exploded structure and a combined structure of a linear vibration motor according to an embodiment of the present invention.

As shown together in FIG. 1 and FIG. 2, the linear vibration motor of the present embodiment mainly comprises a housing, a vibrator and a stator, and the stator and the vibrator are arranged in a vertical direction. Wherein, the housing comprises an upper housing 1 and a back cover 2; the vibrator comprises a counterweight block 31 and a vibration block embedded in and fixed to the counterweight block 31; and the vibration block comprises permanent magnets and a magnetic conductive yoke coupled between the permanent magnets. After the electromagnet in the stator is energized, the permanent magnet in the vibration block and the electromagnet in the stator generate the push-pull forces which interact with each other. By changing the current direction of the electromagnet in the stator, the direction of the magnetic field line of the magnetic field generated by the stator is changed, so as to drive the vibrator to move reciprocally along the direction parallel to the plane in which the stator is located.

As can be seen from the drawings, since the stator and the vibrator are arranged in parallel, the magnetization direction of the permanent magnet is perpendicular to the axial direction of the coil, and the vibration direction of the vibrator is also parallel to the plane in which the stator is located, in this way, the thickness of the motor can be effectively reduced on the basis of ensuring the vibration space of the vibrator, thereby facilitating the miniaturization application of the motor.

Specifically, in the embodiment shown in FIGS. 1 and 2, the vibration block consists of three permanent magnets 32a, 32b, 32c disposed adjacent to each other, and the magnetic conductive yokes 33a and 33b disposed between adjacent permanent magnets, respectively. The electromagnet in the stator comprises two coils 41a, 41b arranged corresponding to the vibrator and the magnetic conductive cores 42a and 42b respectively provided in the coils. The magnetic conductive yokes and the magnetic conductive cores are alternately arranged, and each of the magnetic conductive cores is located at a side of the corresponding magnetic conductive yoke away from the center of the vibrator. The "corresponding" refers to the magnetic conductive core/magnetic conductive yoke which can influence each other and change the direction of the magnetic field line. In the drawings, the alternating arrangement of the magnetic conductive yokes and the magnetic conductive cores is as follows: the magnetic conductive core 42a, the magnetic conductive yoke 33a, the magnetic conductive yoke 33b, the magnetic conductive core 42b, in which the magnetic conductive core 42a corresponds to the magnetic conductive yoke 33a, and the magnetic conductive yoke 33b corresponds to the magnetic conductive core 42b.

Figure 3A:
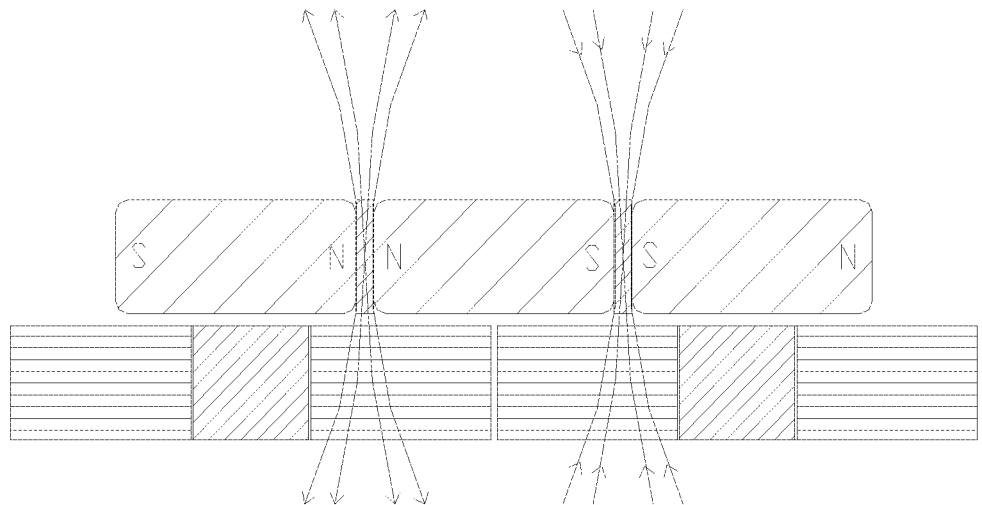
FIG. 3a and FIG. 3b each is a schematic diagram of a combined structure of a vibration block and a stator according to an embodiment of the present invention.
Figure 3B:
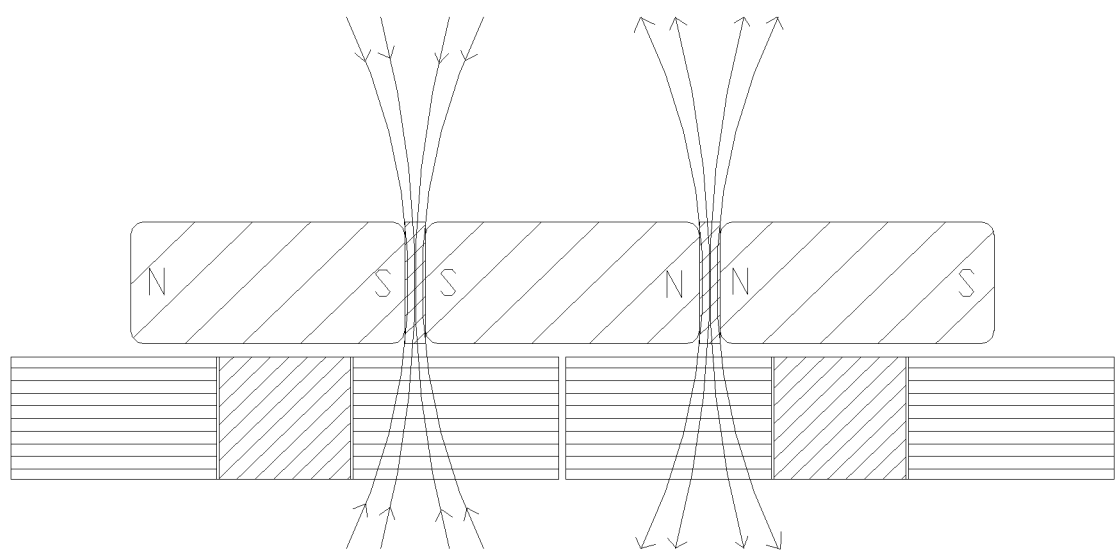

Wherein, the combined structure of the vibration block and the stator is shown in FIG. 3a and FIG. 3b. Among the three permanent magnets disposed adjacent to each other, adjacent ends of the adjacent permanent magnets have the same polarity, ie, presenting the sequence of S-N, N-S, S-N (as shown in FIG. 3a), or the sequence of N-S, S-N, N-S (as shown in FIG. 3b). The magnetic conductive yoke is disposed between the adjacent permanent magnets, and the magnetization direction of the permanent magnets is perpendicular to the axial direction of the coil of the stator. Here, the axial direction of the coil is the direction in which the central axes of the coil and the magnetic conductive core therein are located, and in the embodiment shown in FIGS. 3a and 3b, the magnetization direction of the magnet is the horizontal direction and the axial direction of the coil is the vertical direction.

Since the repulsive force is generated between the two adjacent ends of two permanent magnets having the same polarity, the magnetic field lines of the permanent magnets can concentratedly passes through the magnetic conductive yoke between two adjacent permanent magnets and the coil provided under the vibration block. On the basis of minimizing the space occupied by the stator and the vibrator as much as possible, this kind of structural design can also maximize the magnetic flux passing through the coil.

Figure 4:
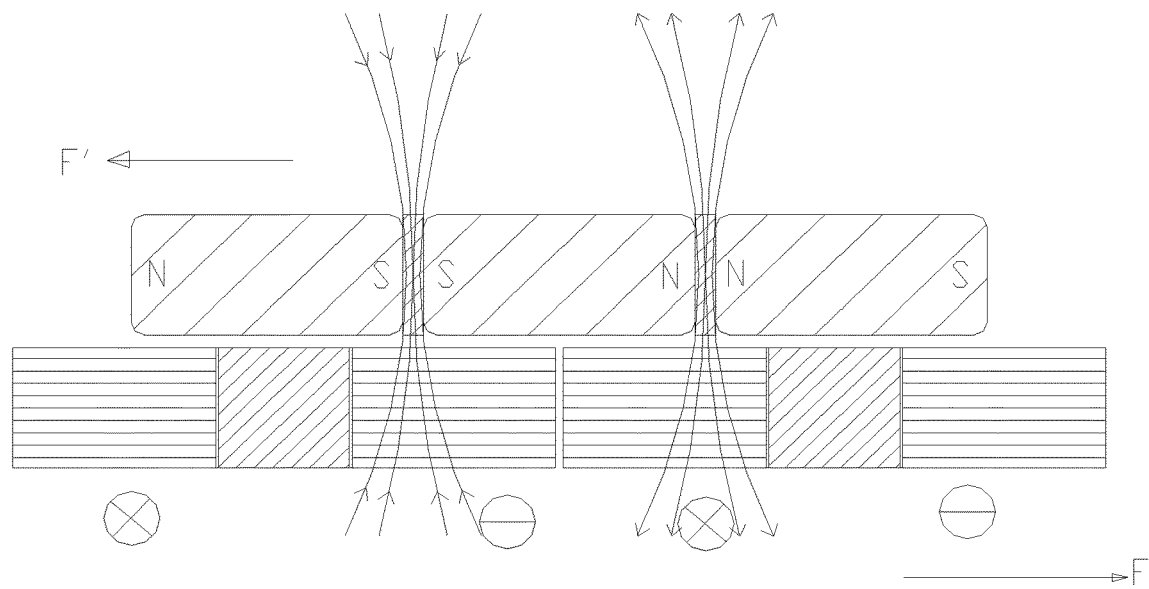
FIG. 4 is a schematic diagram of an operating principle according to an embodiment of the present invention.

The operation principle of the linear vibration motor of the present invention will be briefly described below by taking FIG. 4 as an example. According to the left hand rule for determining the direction of the force that the energized conductor is subjected to in the magnetic field, the left hand is stretched out, so that the thumb is perpendicular to the remaining four fingers, and all of the fingers are in the same plane with the palm; then the magnetic induction lines enter into the centre of the palm and the four fingers point to the current direction, at this moment, the direction pointed by the thumb is the direction of the Ampere force that the energized conducting wire is subjected to in the magnetic field. It is assumed that the current direction in the coil which is indicated by "⊖" in the drawings is the inward direction perpendicular to the drawing plane, and the current direction in the coil which is indicated by "⊗" in the drawings is the outward direction perpendicular to the drawing plane. It is assumed that the first coil is "⊗ and ⊖", and the second coil must also be "⊗ and ⊖", in this way, the coils will all be subjected to the rightward force F. Since the coil is fixed immovably, based on the relationship between the action force and the reaction force, the permanent magnet is subjected to the leftward force F'. In this way, the permanent magnet, which is pushed to the left by the leftward force, drives the counterweight block together to move to the left, so as to squeeze the spring on the left side of the counterweight block and stretch the spring on the right side of the counterweight block. Similarly, when the current direction is changed, the magnetic field force F that the coil is subjected to is the leftward force according to the left-hand rule. But since the coil is fixed immovably, the permanent magnet is subjected to the force F' which has a direction opposite to the direction of the force F and has the same magnitude as the force F. The permanent magnet, which is pushed to the right by the rightward force, drives the counterweight block together to move to the right. At the same time, the springs at the two ends of the counterweight block will continue to be stretched/squeezed after being restored to its original state from the state of squeezing/stretching. The above-mentioned motions are carried out alternately, so that the vibrator formed by the vibration block, which is composed of the permanent magnets and the magnetic conductive yokes, and the counterweight block reciprocate in a direction parallel to the mounting plane of the stator.

In the above embodiment, the vibration block comprises three permanent magnets, but is not limited to the above structure in the specific application process. The number of permanent magnets constituting the vibration block may also be appropriately selected according to the magnitude of the vibration force required for the application products, for example, more permanent magnets or a combined structure of a vibration block consisting of two permanent magnets and a stator shown in FIGS. 5a and 5b may be provided.

Figure 5A:
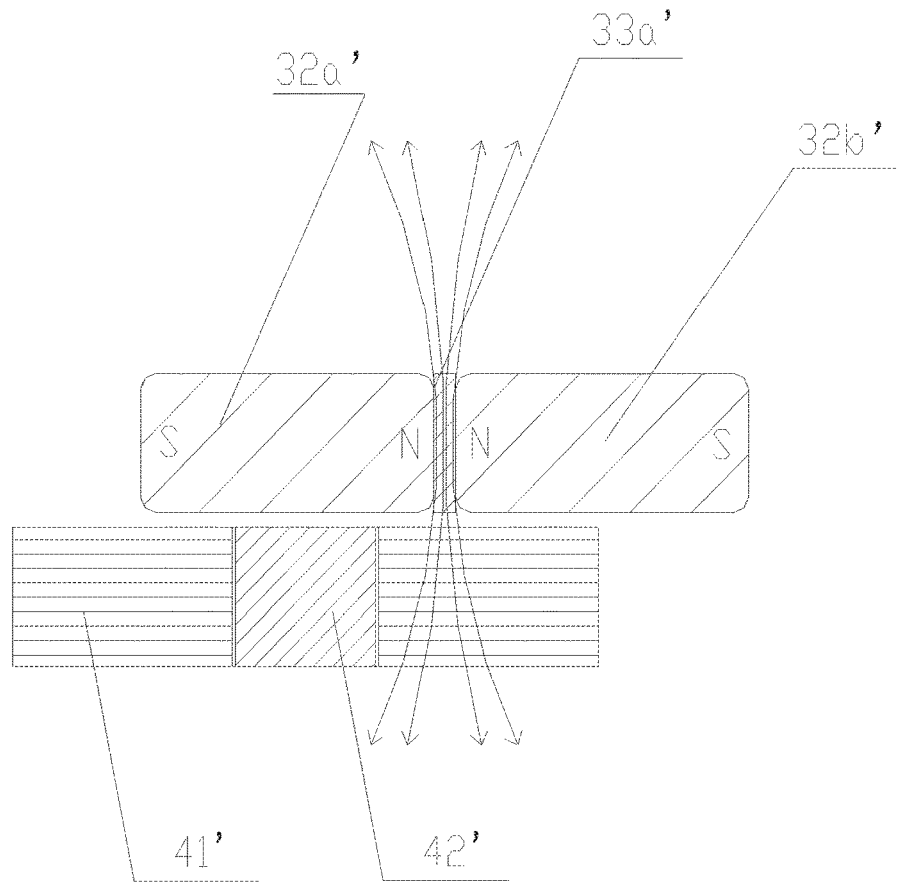
FIG. 5a and FIG. 5b each is a schematic diagram of a combined structure of a vibration block and a stator according to another embodiment of the present invention.
Figure 5B:
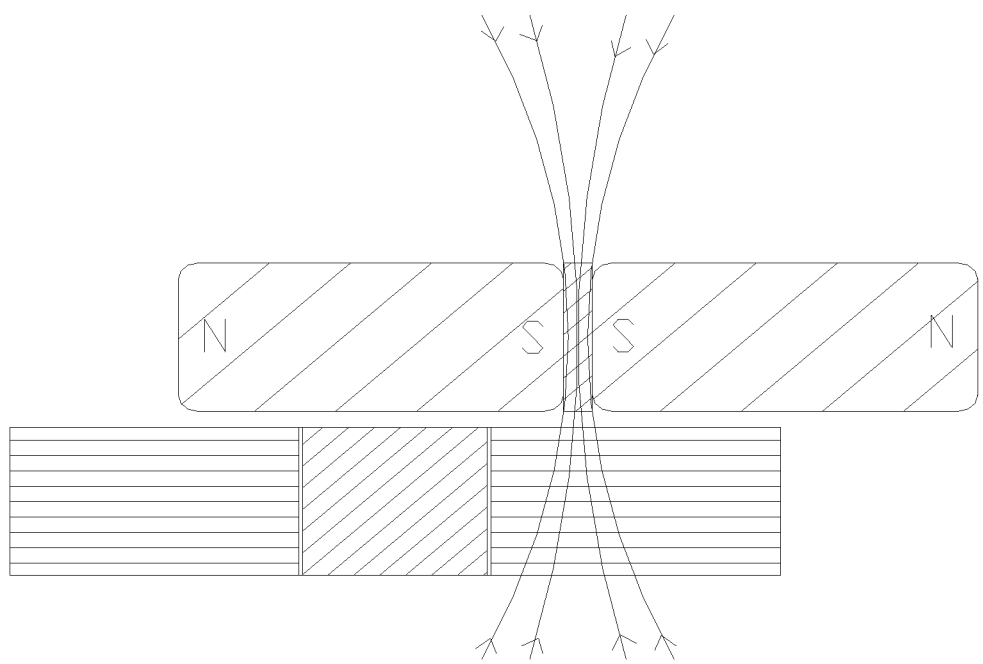

As shown in FIGS. 5a and 5b, the vibration block comprises two permanent magnets 32a' and 32b' disposed adjacent to each other, and the adjacent ends of the two permanent magnets have the same polarity. And a magnetic conductive yoke 33a' is arranged between the two permanent magnets 32a', 32b'. The stator composed of the coil 41' and the magnetic conductive core 42' disposed in the coil 41' is disposed under the vibration block, and the magnetic conductive yoke 33a' and the magnetic conductive core 42' are misaligned.

In the embodiment shown in FIGS. 1 and 2, the vibration block is embedded and fixed in the counterweight block to drive the counterweight block to vibrate horizontally. Specifically, an avoiding structure for avoiding the stator is arranged in the middle portion of the counterweight block, and a groove for accommodating the vibration block is arranged at a central position of the avoiding structure on the counterweight block. In a specific assembly process, the permanent magnets and the magnetic conductive yoke consisting of the vibration block may be firstly fixed together, and then the vibration block as a whole may be fixed in the groove by glue coating or laser welding.

In addition, the linear vibration motor of the present invention further comprises two vibration guiding shafts 51a, 51b, limit springs 52a, 52b, and limit blocks 53a, 53b disposed at two ends of the counterweight block 31, and the limit springs are sleeved on the vibration guiding shafts 51a, 51b. In the embodiment shown in FIGS. 1 and 2, the limit blocks 53a, 53b are respectively fixed on the upper housing 1, the two vibration guiding shafts 51a, 51b are respectively fixed on two ends of the counterweight block 31, and the limit blocks 53a, 53b are further provided with the guiding holes 56a for reciprocating movements of the vibration guiding shafts. In this way, under the action of the magnetic field generated by the stator after being energized, the vibration block drives the counterweight block 31 and the vibration guiding shafts 51a, 51b fixed at the two ends of the counterweight block 31 to vibrate within the limited range of the guiding holes 56a.

Wherein, the limit springs 52a, 52b respectively sleeved on the vibration guiding shafts 51a, 51b are respectively defined between the counterweight block 31 and the corresponding limit blocks 53a, 53b to provide elastic restoring force for the vibration of the vibrator.

In addition, in order to reduce the frictional force between the vibration guiding shafts 51a, 51b and the guiding holes 56a and improve the product quality, the shaft sleeves 54a, 54b may also be sleeved on one end of the vibration guiding shafts 51a, 51b penetrating into the guiding holes 56a, and the contact surfaces of the shaft sleeves 54a, 54b and the guiding holes 56a are smooth and wear resistant. The addition of the shaft sleeves 54a, 54b reduces the contact area of the vibration guiding shafts 51a, 51b with the guiding holes 56a. Moreover, the shaft sleeves 54a, 54b can be made of high density, surface smooth and wear-resistant material, and the frictional force between the vibration guiding shafts 51a, 51b and the guiding holes 56 can be reduced as much as possible without increasing the cost so as to improve the degree of lubrication.

As another embodiment of the present invention, the limit blocks 53a, 53b may be fixed at the two ends of the counterweight block 31, or the counterweight block 31 and the limit blocks 53a, 53b may be designed as an integral structure. The limit blocks 53a, 53b are provided with guiding holes 56a for the reciprocating motion of the vibration guiding shafts 51a, 51b. The two vibration guiding shafts 51a, 51b are respectively fixed on the upper housing 1, and the shaft sleeves 54a, 54b are sleeved on one end of the vibration guiding shafts 51a, 51b acting on the guiding holes 56a (here, one end close to the counterweight block 31). In this way, under the action of the magnetic field generated by the stator after being energized, the vibration block drives the counterweight block 31 and the limit blocks 53a, 53b fixed at the two ends of the counterweight block 31 to vibrate along the vibration guiding shafts 51a, 51b within the limited range of the guiding holes 56a.

Apparently, the amplitude of vibration of the vibrator determines the depth at which the vibration guiding shafts 51a, 51b penetrate into the guide holes 56a, the distance between the end of the vibration guiding shaft 51a, 51b penetrating into the guiding hole 56a and the bottom end of the guiding hole 56a, and the distance between the edge of the avoiding structure and the outer edge of the stator. In the embodiments shown in FIG. 1, FIG. 2, FIG. 3a, and FIG. 3b, the horizontal distance between the magnetic conductive yoke and the magnetic conductive core corresponding to the magnetic conductive yoke is within a numerical range of 0.1 mm to 0.3 mm, that is, the horizontal distance between the center line of each of the magnetic conductive yokes and the center line of the magnetic conductive core of the corresponding stator (that is, the nearest stator) is 0.1 to 0.3 mm, then correspondingly, the depth at which the vibration guiding shafts 51a, 51b penetrate into the guide holes 56a, the distance between the end of the vibration guiding shaft 51a, 51b penetrating into the guiding hole 56a and the bottom end of the guiding hole 56a, and the distance between the edge of the avoiding structure and the outer edge of the stator all should be slightly larger than 0.2 mm.

The counterweight block 31 can be made of high-density metal material such as tungsten steel block or nickel steel block or nickel-tungsten alloy to increase the vibration force and make the vibration of the electronic product stronger.

In addition, the linear vibration motor provided by the present invention further comprises a flexible circuit board (PFCB) 7, the stator is fixed on the flexible circuit board 7, and the coil lead of the stator is connected to the external circuit through the circuit on the flexible circuit board 7. The flexible circuit board 7 is fixed with the upper housing 1, and the back cover 2 can be fixed with the flexible circuit board 7 by means of snap joint.

In order to provide stable magnetic balance guidance for the motor, the present invention may further be provided with a magnetic balance guiding mechanism, which comprises a pair of balance magnets 61a, 61b respectively disposed on vertical side walls at two ends of the counterweight block 31.

The linear vibration motor according to the present invention is described as above in an exemplary manner with reference to the drawings. However, those skilled in the art should understand that various modifications may be made to the linear vibration motor of the present invention as described above without departing from the scope of the present invention. Therefore, the protection scope of the present invention should be determined by the contents of the appended claims.

What is claimed is:

1. A linear vibration motor, comprising a vibrator and a stator, wherein the vibrator is arranged in parallel with the stator, the vibrator comprises a counterweight block and a vibration block embedded and fixed in the counterweight block, wherein
   a permanent magnet in the vibration block and an electromagnet in the stator generate push-pull forces which interact with each other; and
   the electromagnet in the stator generates a variable magnetic field after being energized, so as to drive the vibrator to conduct a reciprocating motion along a direction parallel to a plane in which the stator is located, by changing directions of magnetic field lines of the magnetic field, wherein:
   the vibration block comprises at least two permanent magnets disposed adjacent to each other and a magnetic conductive yoke disposed between any two adjacent permanent magnets,
   the electromagnet in the stator comprises a coil and a magnetic conductive core located in the coil; and
   the magnetic conductive yoke and the magnetic conductive core are misaligned.

2. The linear vibration motor according to claim 1, wherein a horizontal distance between the magnetic conductive yoke and the magnetic conductive core corresponding to the magnetic conductive yoke is within a numerical range of 0.1 mm to 0.3 mm.

3. The linear vibration motor according to claim 1, wherein the vibration block comprises three permanent magnets disposed adjacent to each other and two magnetic conductive yokes disposed between any two adjacent permanent magnets, adjacent ends of any two adjacent permanent magnets have the same polarities; and
   the stator comprises two coils provided corresponding to the vibrator and two magnetic conductive cores provided in the coils respectively, and an axial direction of the coils is perpendicular to a magnetization direction of the permanent magnets.

4. The linear vibration motor according to claim 1, wherein the stator and the vibrator are arranged in a vertical direction, and a vibration direction of the vibrator is parallel to a plane in which the stator is mounted.

5. The linear vibration motor according to claim 4, wherein vibration guiding shafts, limit springs and limit blocks are provided at two ends of the counterweight block respectively, and the limit springs are sleeved on the vibration guiding shafts and are limited between the counterweight block and the limit blocks;
   guiding holes for reciprocating movements of the vibration guiding shafts are provided in the limit blocks; and
   shaft sleeves are sleeved on one end of the vibration guiding shafts penetrating into the guiding holes.

6. The linear vibration motor according to claim 5, further comprising a housing, wherein the vibration guiding shafts are fixedly connected with the counterweight block, and the limit blocks are fixedly connected with the housing; or
   the vibration guiding shafts are fixedly connected with the housing, and the limit blocks are fixedly connected with the counterweight block.

7. The linear vibration motor according to claim 4, wherein
   an avoiding structure for avoiding the stator is arranged in a middle portion of the counterweight block;
   a groove for accommodating the vibration block is arranged at a central position of the avoiding structure on the counterweight block; and
   after the permanent magnets and the magnetic conductive yoke are integrally fixed, the permanent magnets and the magnetic conductive yoke are fixed in the groove by glue coating or laser welding.

8. The linear vibration motor according to claim 4, wherein the counterweight block is one of a tungsten steel block, a nickel steel block, and a nickel-tungsten alloy block.

9. The linear vibration motor according to claim 4, further comprising a housing and a flexible circuit board, wherein
the stator is fixedly connected with the housing through the flexible circuit board; and
a lead of the coil is connected to an external circuit through a circuit on the flexible circuit board.

* * * * *